(12) United States Patent
Brestel

(10) Patent No.: US 8,281,797 B2
(45) Date of Patent: Oct. 9, 2012

(54) CONTROL VALVE HAVING LIVE LOADED PACKING FOLLOWER WITH LEAK-OFF AND INDEPENDENT SECONDARY SEAL

(75) Inventor: Ronald R. Brestel, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 308 days.

(21) Appl. No.: 12/642,038

(22) Filed: Dec. 18, 2009

(65) Prior Publication Data

US 2011/0147632 A1    Jun. 23, 2011

(51) Int. Cl.
*F16K 41/02* (2006.01)
(52) U.S. Cl. ............... 137/15.18; 137/312; 251/214
(58) Field of Classification Search .............. 251/214; 137/312, 15.18
See application file for complete search history.

(56) References Cited

U.S. PATENT DOCUMENTS

| | | | | |
|---|---|---|---|---|
| 3,512,753 | A * | 5/1970 | Weise | 251/317 |
| 3,559,950 | A * | 2/1971 | Nelson | 251/214 |
| 3,787,060 | A * | 1/1974 | Astill | 277/516 |
| 4,345,766 | A * | 8/1982 | Turanyi | 277/329 |
| 4,844,411 | A * | 7/1989 | Nelson | 251/214 |
| 4,964,432 | A * | 10/1990 | Chou | 137/15.24 |
| 5,178,363 | A | 1/1993 | Icenhower et al. | |
| 5,263,682 | A * | 11/1993 | Covert et al. | 251/214 |
| 5,476,117 | A | 12/1995 | Pakula | |
| 5,927,685 | A | 7/1999 | Gosling | |
| 7,249,751 | B2 * | 7/2007 | Hall et al. | 251/214 |

FOREIGN PATENT DOCUMENTS

EP    0841511 A1    5/1998

OTHER PUBLICATIONS

International Search Report for PCT/US2010/056408, dated Feb. 11, 2011.
Written Opinion of the International Search Authority for PCT/US2010/056408, dated Feb. 11, 2011.
International Preliminary Report on Patentability (IPRP) for PCT/US2010/056408, mailed Jun. 28, 2012.

* cited by examiner

*Primary Examiner* — John Bastianelli
(74) *Attorney, Agent, or Firm* — Marshall, Gerstein & Borun LLP

(57) ABSTRACT

A control valve includes a valve body, a valve stem, and a control element. The valve body receives the stem and includes a packing box housing a packing set. A packing follower includes a bore sized to receive the stem and includes an upper portion, a lower portion, and a bearing surface, the lower portion sized to extend into the valve bonnet to engage the packing set to apply a first compressive force to the packing set, the upper portion including threads and having an upper counterbore housing a secondary seal ring. A nut operatively engages the threads of the upper portion of the packing follower, the nut positioned to apply a second compressive force to the secondary seal ring, and a spring is positioned between the packing flange and the bearing surface of the packing follower, wherein the first compressive force is independent of the second compressive force.

16 Claims, 5 Drawing Sheets

PRIOR ART FIG.2

CONTROL VALVE HAVING LIVE LOADED PACKING FOLLOWER WITH LEAK-OFF AND INDEPENDENT SECONDARY SEAL

FIELD OF THE INVENTION

The present invention relates generally to control valves and, more specifically, to a live loaded packing follower arrangement for use on control valves, and to control valves incorporating such an arrangement.

BACKGROUND

It is generally known that process plants, such as refineries, chemical plants or pulp and paper plants, consist of numerous process control loops connected together to produce various products. Flow control valves are disposed in the process control loop, and typically use a control element such as a valve plug, a valve disc, a globe, or other suitable control element, in order to manipulate a fluid flowing through the system, such as gas, steam, water, or a chemical compound. It is generally understood that various control valve configurations may be specifically applicable for certain applications. For example, when a quick-opening valve with a narrow control range is suitable, a rotary control valve, such as a butterfly valve, may be used. Alternatively, when precise control over a large control range is required, a sliding stem control valve having a valve plug may be used. In any configuration, such control valves are generally coupled to a control device such as an actuator, which controls the exact opening amount of the control valve in response to a control signal. In each case, the valve stem extends into the valve body and is connected to the control element.

In order to prevent or minimize leakage past the valve stem, control valves typically employ valve packing around the valve stem. Such valves often use a packing flange and a packing follower, which apply pressure to the valve packing. The valve packing is typically separated into two distinct packing sets separated by a lantern ring. In such an arrangement, a leak-off port is provided through the valve body to provide flow communication adjacent the lantern ring. Such an arrangement allows personnel to determine whether the packing below the lantern ring has failed.

DETAILED DESCRIPTION OF THE PREFERRED EMBODIMENTS

Although the following text sets forth a detailed description of an exemplary embodiment of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Based upon reading this disclosure, those of skill in the art may be able to implement one or more alternative embodiments, using either current technology or technology developed after the filing date of this patent. Such additional embodiments would still fall within the scope of the claims defining the invention.

Figure 1:
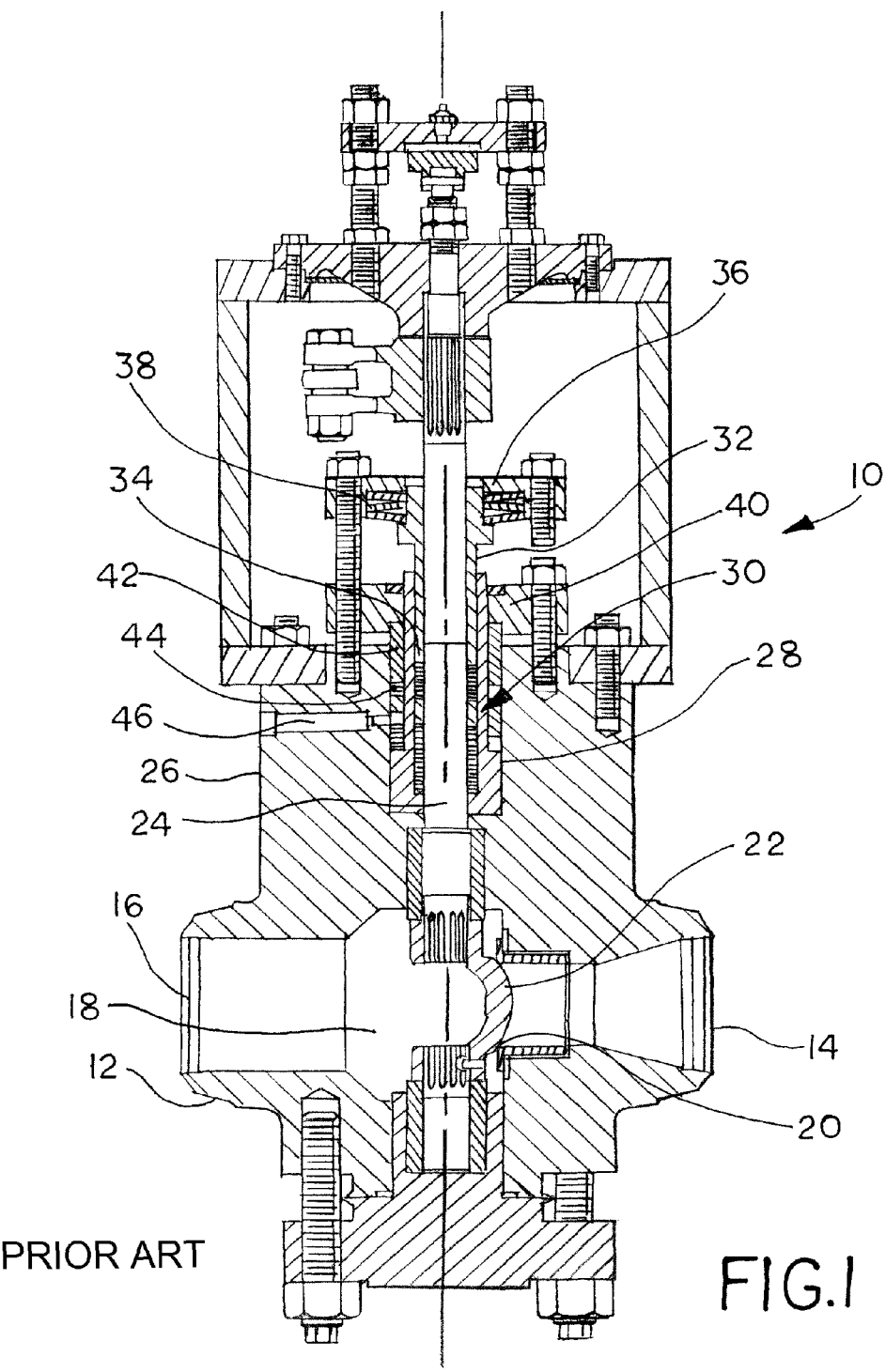
FIG. 1 is a cross-sectional view of an exemplary prior art control valve having a rotating stem and employing a live loaded packing follower with a leak-off port through the valve body.

A prior art valve packing and packing follower arrangement is shown in FIG. 1 installed on an exemplary control valve 10 of the type commonly employed in process control systems, with the control valve 10 of FIG. 1 illustrating a rotary stem control valve 10. The control valve 10 includes a valve body 12, a valve inlet 14, a valve outlet 16, and a flow passage 18 that extends between the inlet 14 and the outlet 16. The flow passage 18 includes a control passage 20, and a moveable control element 22 is movably disposed in the control passage 20. In the example of FIG. 1, the control element 22 in the control valve 10 takes the form of a rotary control element. The control element 22 of FIG. 1 may be, for example, a valve disc, a globe or ball, or any other form of a rotating control element. In the example of FIG. 1, the control element 22 is connected to a valve stem 24 which, as outlined above, is a rotary stem. The valve stem 24 is operatively coupled to an actuator, which may be any kind of suitable actuator of the types commonly employed in the art. The control element 22 is positioned such that the valve plug is disposed in the control passage 20, and using the actuator the position of the control element 22 within the control passage 20 may be controlled, so as to control the amount of fluid flow through the control passage. The control valve 10 includes a packing box 28 which, in the example shown, is disposed within the valve body 12, and a prior art primary packing set is disposed in the packing box 28.

As shown in FIG. 1, the control valve 10 includes a packing follower 32 which surrounds a portion of the valve stem 24, and which includes a lower portion 34 that extends into the packing box 28 into a position to apply a compressive force to the primary packing set 30. The packing follower 32 is held in place by an upper retaining flange 36, which may be suitably bolted to the valve body 12 (either directly to the valve body, or to a bonnet, should the valve have a bonnet). A series of disc spring washers 38 are provided, and are positioned between the retaining flange 36 and the packing follower 32. Consequently, by adjusting the bolting force of the retaining flange 36, the amount of compressive force on the primary packing set 30 can be controlled. The control valve 10 also includes a lower retaining flange 40, which again is suitably bolted to the valve body 12. The lower retaining flange 40 bears against a bushing 42, which in turn compresses a secondary packing set 44 also disposed in the packing box 28. By adjusting the bolting force of the lower retaining flange 40, the amount of compressive force on the secondary packing set 44 can be controlled. Consequently, in order to suitably compress both the primary packing set 30 and the secondary packing set 44, two retaining flanges (the upper retaining flange 36 and the lower retain flange 40) are required. A leak-off port 46 is provided, which typically extends through the valve body 12. Both the primary packing set 30 and the secondary packing set 44 include lantern rings (shown in greater detail in FIG. 3), which allow any leakage past either one of the packing sets 30, 44 to flow into the leak-off port 46. In the arrangement shown, the secondary packing set 44 is static and provides a means to repair the packing bore. In many applications, the secondary packing set may be omitted.

Figure 2:
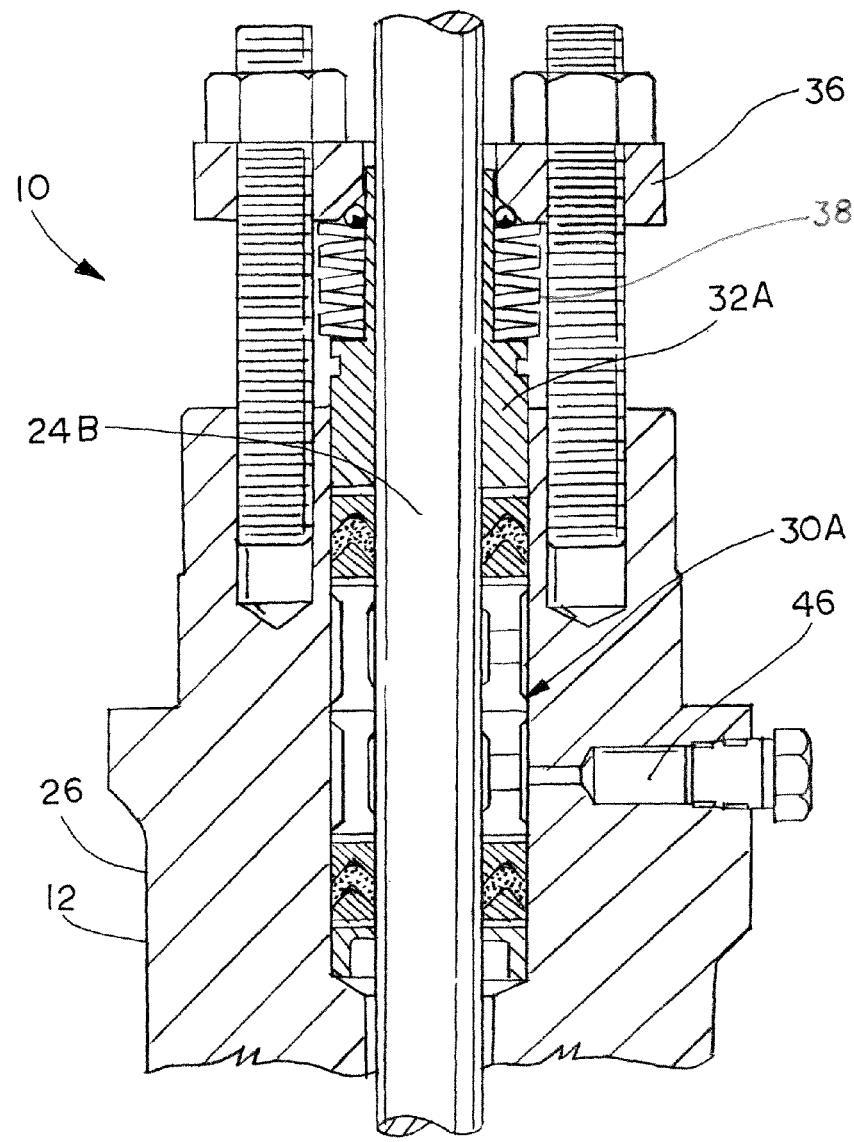
FIG. 2 is an enlarged fragmentary cross-sectional view of aspects of another exemplary prior art control valve having a sliding stem and also employing another live loaded packing follower arrangement with a double packing set.

FIG. 2 illustrates another conventional arrangement in which another conventional packing follower 32A is positioned to engage another conventional packing set 30A, with the packing follower 32A adjustably held in place by the retaining flange 36. The retaining flange 36 is attached to the valve body by being bolted to a valve bonnet 26. Again, the disc spring washers 38 are positioned between the retaining flange 36 and a packing follower 32A. As with the example of FIG. 1, a leak-off port 46 is provided, which extends through the bonnet 26, and the packing assembly includes an upper packing set and a lower packing set separated by lantern rings (shown in greater detail in FIG. 3) to allow any leakage past the lower packing set to be communicated to the leak-off port 46. In the example of FIG. 2, the valve stem 24 is a sliding stem 24B, which is operatively connected to a control element such as any conventional sliding stem control element (not shown).

Figure 3:
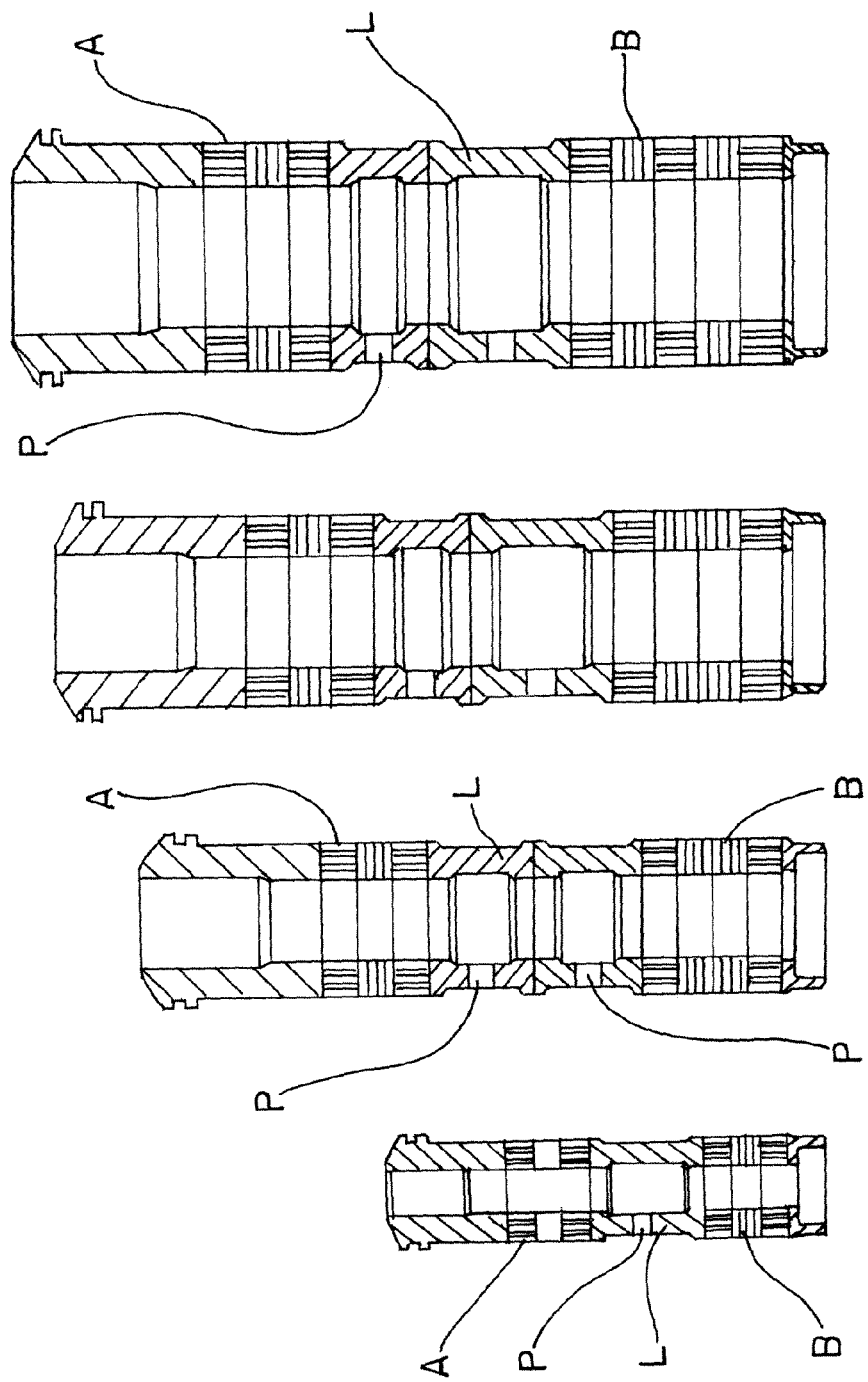
FIG. 3 is an enlarged fragmentary cross-sectional view of four different conventional packing set arrangements, each employing a pair of packing sets separated by one or more lantern rings.

Referring now to FIG. 3, four (4) conventional packing set arrangements are shown. In each of the examples of FIG. 3, the packing set arrangements include an upper packing set A and a lower packing set B, separated by one or more lantern rings L. Each of the lantern rings L includes a port P, and the port P is arranged to communicate with the leak-off port 46 in the valve body as discussed above.

Figure 4:
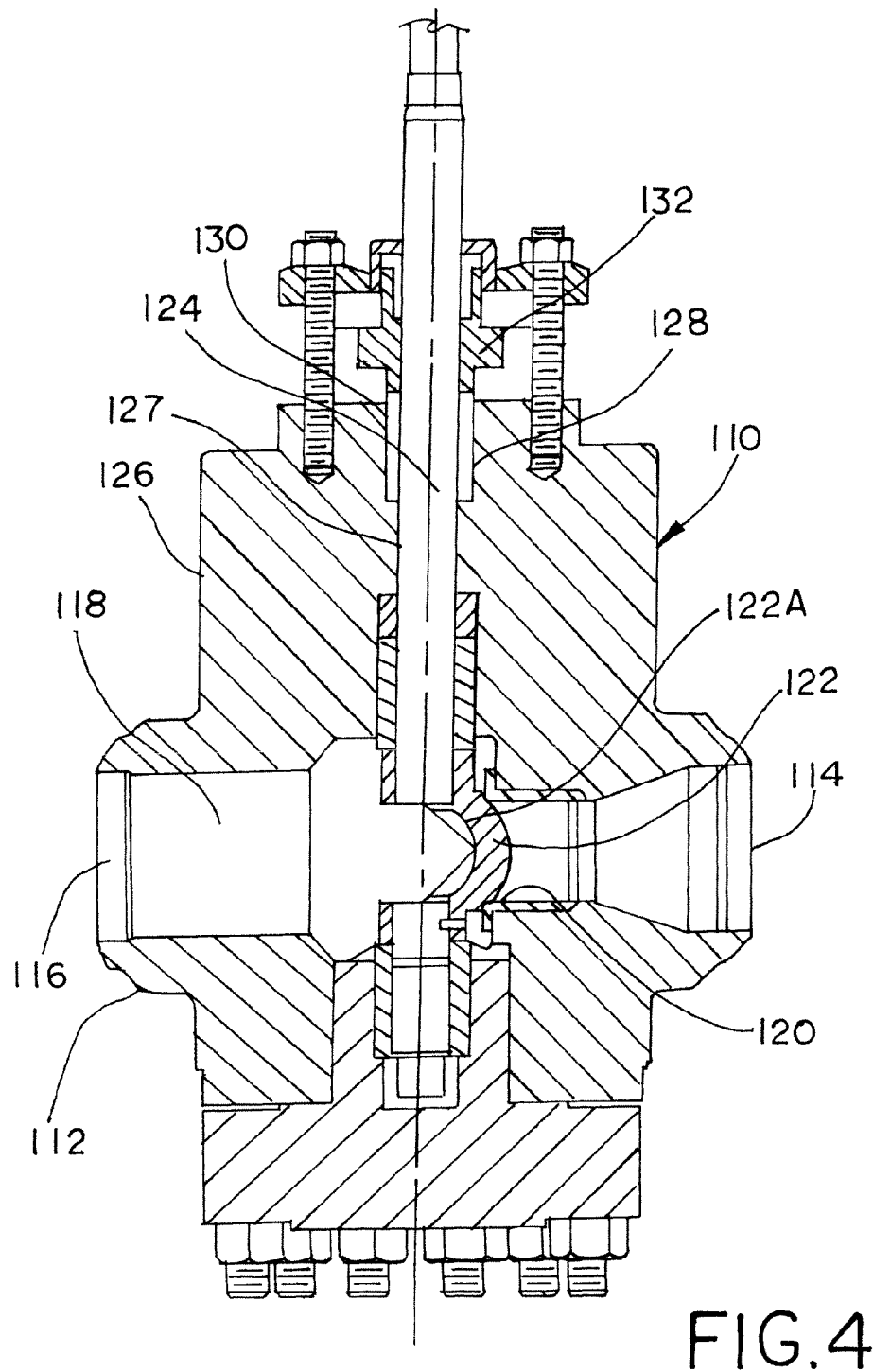
FIG. 4 is a cross-sectional view of a live loaded packing assembly assembled in accordance with the teachings of the disclosed invention.
Figure 5:
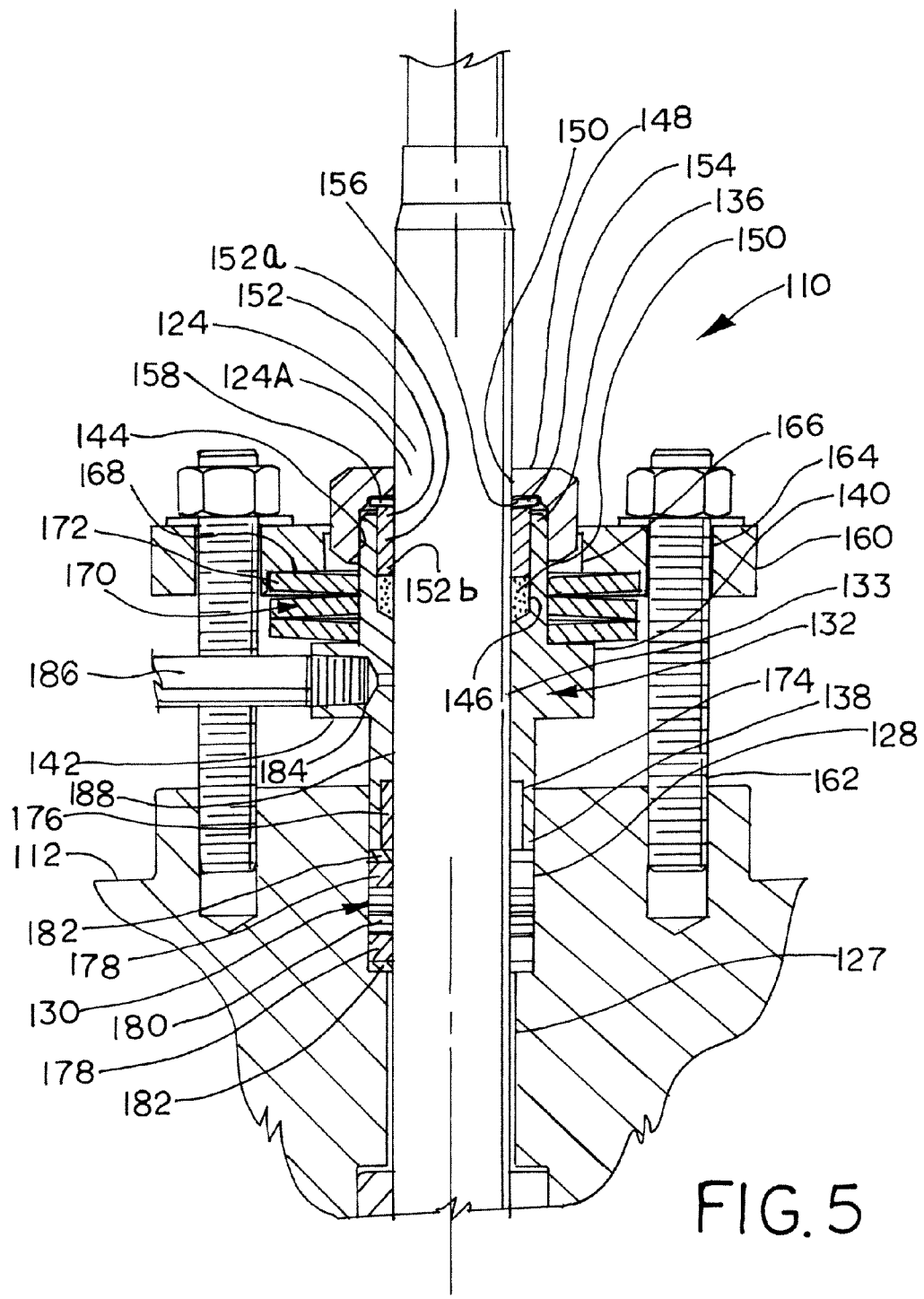
FIG. 5 is an enlarged fragmentary cross-sectional view of the assembly shown in FIG. 4.

Referring now to FIGS. 4 and 5, a control valve 110 assembled in accordance with the teachings of the disclosed example of the present invention is shown. The illustrated control valve 110 is a rotary stem control valve. However, upon reading the present disclosure, those of skill in the art will be able to readily adapt the teachings discussed herein to sliding stem control valves, in which the valve stem is connected to, for example, a valve plug, a valve sleeve, or any other form of a sliding control element. The control valve 110 includes a valve body 112, a valve inlet 114, a valve outlet 116, and a flow passage 118 that extends between the inlet 114 and the outlet 116. The valve inlet 114, the valve outlet 116, and the flow passage 118 are only visible in FIG. 4. The flow passage 118 includes a control passage 120, and a moveable control element 122 is movably disposed in the control passage 120. The control passage 120 and the control element 122 are only visible in FIG. 4. Once again, in the example of FIGS. 4 and 5, the control element 122 is a rotary control element 122A connected to a valve stem 124 which, in the example of FIGS. 4 and 5, is a rotary valve stem 124A. Alternatively, the teachings discussed herein may be applied to a sliding stem, such as the sliding stem 24B outlined in FIG. 2. The control element 122A of FIG. 4 may be, for example, a valve disc, a globe or ball, or any other form of a rotating control element. The valve stem 124 is operatively coupled to an actuator, which may be any kind of suitable actuator of the types commonly employed in the art. The control element 122 is positioned such that the control element 122 is disposed in the control passage 120, and the position of the control element 122 within the control passage 120 can be controlled using the actuator, so as to control the amount of fluid flow through the control passage 120. The control valve 110 includes a bore 127 which is sized to receive the valve stem 124. The valve body 112 includes a packing box 128, and a primary packing set 130 is disposed in the packing box 128. The packing set is sized to fit around the valve stem 124.

Referring now to FIG. 5, the control valve 110 includes a packing follower 132 which has a central bore 133 and which surrounds a portion of the valve stem 124. The packing follower 132 includes a first or upper portion 136 and a second or lower portion 138, and the lower portion 138 extends into the packing box 128 into a position to apply a compressive force to the primary packing set 130 as will be explained in further detail below. The packing follower 132 includes a bearing surface 140 which, in the example shown, takes the form of an annular flange 142. An outer portion of the upper portion 136 includes threads 144, while the central bore 133 includes a counterbore 146 adjacent the upper portion 136. A threaded nut 148 includes a central bore 150 sized to fit over the valve stem 124, and the threaded nut is sized to engage the threads 144 of the packing follower 132. A secondary seal ring 150 is disposed in the counterbore 146 of the packing follower 132. A bushing 152 includes an upper portion 152a and a lower portion 152b, and is disposed in the counterbore 146 above the secondary seal ring 150. In the example shown, the bushing 152 is positioned within the counterbore 146 such that the upper portion 152a engages a spring 156, which bears against an inner portion 154 of the threaded nut 148, and the lower portion 152b engages the secondary seal ring 150. Accordingly, by adjusting the threaded nut 148 on the threads 144, the compressive force applied to the secondary seal ring 150 can be adjusted. In the example shown, a spring 156 is disposed between the inner portion 154 of the threaded nut 148 and the upper portion 152a of the bushing 152. Further, in the example shown, the spring 156 takes the form of a disc spring washer 158.

A packing flange 160 is attached to the valve body 112 (or to the valve bonnet if the particular valve includes a bonnet), and is adjustably secured by a series of attachment bolts 162 positioned through a series of holes 164. The packing flange 160 includes a central aperture 166 sized to receive the upper portion 136 of the packing follower 152 as well as the threaded nut 148 without interference. The packing flange 160 also includes a downwardly facing surface 168. A spring 170 is disposed between the bearing surface 140 of the packing follower 132. In the disclosed example, the spring 170 takes the form of a series of stacked disc spring washers 172. Consequently, because the packing follower 132 is operatively coupled to the packing flange 160 by a spring 170, the downward force on the packing follower 132 can be adjusted via adjusting the position of the packing flange 160 relative to the valve body 112.

The lower portion 138 of the packing follower 132 preferably includes a counterbore 174 sized to receive a cylindrical bushing 176. In the disclosed example, the bushing 176 serves as a valve stem guide. The lower portion 138 of the packing follower 132 is positioned to bear against the packing set 130. Preferably, the packing set 130 may include conventional components, such as a pair of filament rings 178 separated by laminated rings 180, and straddled by upper and lower washers 182. The packing set 130 need not include, and as shown does not include, a lantern ring of the type conventionally employed in the art. The lower portion 138 of the packing follower 132, in conjunction with the bushing 176, a position to bear against an upper portion of the packing set 130, such as by bearing against the upper washer 182.

The packing follower 132 includes a leak-off port 184 which, in the disclosed example, extends generally radially outward through the annular flange 142. The leak-off port 184 is in flow communication with the bore 133 that extends through the packing follower 132, and the leak-off port 184 preferably is connected to a conduit 186, which typically is connected to some means or mechanism for diverting leakage or for detecting leakage. In the event of any leakage past the packing assembly 130, the leakage will flow into a space 188 between the valve stem 124 and the bore 133 of the packing follower 132.

A control valve and/or a valve packing assembly assembled in accordance with one or more aspects of the present disclosure may extend and/or maximize the service life of the valve packing. In accordance with the disclosed example, the load on the primary packing set may be adjusted in a manner that is independent of the load on the secondary seal. Therefore, the primary packing set and the secondary seal can each be loaded at a desired load, without overloading one of the sealing components to the disadvantage of the other sealing component.

Further, when assembled as discussed herein, the valve body and/or the valve bonnet may be devoid of a leak-off port. Also, in the event the teachings of the present invention are applied to an existing control valve already having an existing leak-off port drilled in the bonnet or in the valve body, the existing leak-off port may be temporarily plugged or permanently plugged.

Those of skill in the art will appreciate that on many valves it is desirable to have some means to determine if the valve packing is leaking, and it is also desirable to have some means to capture the leakage. In the past, these needs have been addressed by using a double packing arrangement in which a leak-off port is provided between two packing sets, with the two packing sets separated by a lantern ring. This approach may suffer from one or more potential drawbacks. For example, although a desired load can be applied to the top packing set, only a fraction of that load is transmitted to the lower packing set. Of course the lower packing set needs to provide an adequate seal against the pressure within the control valve, but the load on the lower packing set is compromised by the upper packing set. Moreover, using two packing sets results in much higher friction in the valve stem, and more consolidation of packing material results in loss of packing stress thus causing increased leakage. Consequently, the conventional leak-off port has to be provided in the valve body or the valve bonnet. The conventional leak-off port drilled through the valve body or through the valve bonnet increases the manufacturing cost of the control valve, and also creates potential installation and service issues, as the lantern ring must be properly aligned with the leak-off port.

In accordance with the disclosed example, it is possible to address various packing issues using aspects of known technology, and also to provide for a leak-off function that does not compromise the performance of the packing. In accordance with the exemplary form outlined herein, it is possible to subject the packing assembly to a relatively constant and correct or desired amount of load or stress in order to affect a seal, and this is often achieved by using live-load springs. It is also possible to follow the teachings herein in order to use no more packing than the minimum required to effect a seal. This approach minimizes the adverse effects of thermal expansion of the packing, and also reduces packing friction. In the present approach, it is also possible to install less-pliable anti-extrusion rings on either side of the packing, as these anti-extrusion rings reduce or prevent the packing from extruding out of the packing area, and it is also possible to provide stem bushings or other type of stem guide, as this helps to keep the stem aligned within the packing set, and to use a smooth, polished valve stem, as this approach reduces packing friction and wear and minimizes the occurrence of leak paths.

When assembled in accordance with the exemplary form of the invention outlined herein, the resulting control valve and/or the packing assembly exhibits improved performance as compared to existing packing assemblies, such as, for example, the SS-84 packing available from Emerson. In accordance with the disclosed example, the present improved packing assembly outlined herein may be more compact and simple, and therefore the present packing assembly can be used on other products. The present improved design also provides independent live load for the leak-off seal, and an additional bushing to protect the stem. Further, the present exemplary design does not require drilling a leak-off hole in the valve body or the bonnet. A leak-off hole is difficult to machine and locate, and creates an interrupted surface in the packing bore. Accordingly, it is desirable to have a design in which the valve body and/or the valve bonnet are devoid of a separate leak-off port.

The exemplary form of the invention discussed herein also may experience several additional advantages. For example, the packing studs may be placed at a greater diameter compared to conventional assemblies, which allows for better disc spring washer design. Further, the secondary seal ring disposed within the disclosed packing follower does not have pressure across it. Instead, the secondary seal ring only needs to divert any packing leakage, such as toward the leak-off port in the packing follower, which is at or near atmospheric pressure. The disclosed assembly may thus result in a valve that is more suitable for long service and infrequent maintenance, such as applications within nuclear containment environments.

Numerous modifications and alternative embodiments of the invention will be apparent to those skilled in the art in view of the forgoing description. Accordingly, this description is to be construed as illustrative only and is for the purpose of teaching those skilled in the art the best mode of carrying out the invention. The details of the present disclosure may be varied without departing from the spirit of the invention, and the exclusive use of all modifications which are within the scope of the claims is reserved.

The invention claimed is:

1. A method of preparing a control valve having a live loaded packing assembly and an independent secondary seal comprising:
   providing a valve body having an inlet, an outlet, and a flow passage extending between the inlet and the outlet,
   providing the valve with a packing box and a bore sized to receive a valve stem;
   selecting a primary packing set and pacing the primary packing set in the packing box;
   adjustably coupling only a single packing flange to the valve body;
   providing a packing follower having a bore sized to receive a portion of the valve stem, the packing follower having an upper portion, a lower portion, and a bearing surface;
   placing the packing follower into the packing box and positioning the packing follower over the primary packing set, and securing the packing follower in place with a packing flange to thereby apply a first compressive force to the primary packing set;
   providing the upper portion of the packing follower with threads and an upper counterbore housing a secondary seal ring;
   applying a threaded nut threaded to the threads of the upper portion of the packing follower to thereby apply a second compressive force to the secondary seal ring; and
   positioning a spring between the packing flange and the bearing surface of the packing follower;
   wherein the first compressive force is independent of the second compressive force.

2. A control valve having a live loaded packing assembly and comprising:
   a valve body having an inlet, an outlet, and a flow passage extending between the inlet and the outlet;

a valve stem extending from the valve body and operatively coupled to a control element movably disposed in the flow passage;

the valve body having a bore sized to receive the valve stem and further having a packing box;

a primary packing set disposed in the packing box;

a packing flange adjustably coupled to the valve body;

a packing follower having a bore sized to receive a portion of the valve stem, the packing follower having an upper portion, a lower portion, and a bearing surface, the lower portion sized to extend into the valve body and operatively coupled to the primary packing set to apply a first compressive force to the primary packing set, the upper portion including threads and having an upper counterbore housing a secondary seal ring;

a threaded nut operatively engaging the threads of the upper portion of the packing follower, the threaded nut positioned to operatively apply a second compressive force to the secondary seal ring; and a spring, the spring operatively positioned between the packing flange and the bearing surface of the packing follower;

wherein the first compressive force is independent of the second compressive force.

3. The control valve of claim 2, wherein the spring comprises a disc spring washer.

4. The control valve of claim 2, wherein the spring comprises a series of stacked disc spring washers.

5. The control valve of claim 2, including a bushing disposed in the upper counterbore and positioned to operatively engage the secondary seal ring.

6. The control valve of claim 2, including a second spring disposed between the bushing and the threaded nut.

7. The control valve of claim 6, wherein the second spring comprises a disc spring washer.

8. The control valve of claim 2, including a lower counterbore formed in the lower portion of the packing follower, and including a bushing disposed in the lower counterbore, the bushing and the lower portion of the packing follower cooperating to engage the primary packing set.

9. The control valve of claim 2, including a leak-off port formed in the packing follower, the leak-off port communicating with the bore.

10. The control valve of claim 2, wherein the leak-off port extends through the bearing flange of the packing follower.

11. The control valve of claim 2, wherein the primary packing set includes only a single packing set and is devoid of a lantern ring.

12. A control valve having a live loaded packing assembly and comprising:

a valve body having an inlet, an outlet, and a flow passage extending between the inlet and the outlet, the valve body including a packing box and a bore sized to receive a valve stem;

a primary packing set disposed in the packing box;

a packing flange adjustably coupled to the valve body;

the valve stem extending through the bore of the valve body and operatively coupled to a control element movably disposed in the flow passage;

a packing follower having a bore sized to receive a portion of the valve stem, the packing follower having an upper portion, a lower portion, and a bearing surface, the lower portion sized to extend into the packing box and operatively coupled to the primary packing set to apply a first compressive force to the primary packing set, the upper portion including threads and having an upper counterbore housing a secondary seal ring;

a threaded nut threaded to the threads of the upper portion of the packing follower, the threaded nut positioned to operatively apply a second compressive force to the secondary seal ring; and a spring operatively positioned between the packing flange and the bearing surface of the packing follower;

wherein the first compressive force is independent of the second compressive force.

13. The control valve of claim 12, wherein the spring comprises a disc spring washer.

14. The control valve of claim 12, including a bushing disposed in the upper counterbore and positioned to operatively engage the secondary seal ring, and including a spring washer disposed between the bushing and the threaded nut.

15. The control valve of claim 12, including a lower counterbore formed in the lower portion of the packing follower, and including a bushing disposed in the lower counterbore, the bushing and the lower portion of the packing follower cooperating to engage the primary packing set.

16. The device of claim 12, including a leak-off port formed in the packing follower, the leak-off port communicating with the bore, and wherein the primary packing set is devoid of a lantern ring.

* * * * *